United States Patent [19]

Bock

[11] 4,393,319
[45] Jul. 12, 1983

[54] ELECTRIC MOTOR POWERED ACTUATOR

[75] Inventor: Gustavus P. Bock, Bellbrook, Ohio

[73] Assignee: General Motors Corporation, Detroit, Mich.

[21] Appl. No.: 214,199

[22] Filed: Dec. 8, 1980

[51] Int. Cl.³ .............................................. H02K 7/06
[52] U.S. Cl. ....................................... 310/80; 310/83; 310/49 R; 310/156
[58] Field of Search ..................... 310/80, 83, 49, 112, 310/257, 156

[56] References Cited

U.S. PATENT DOCUMENTS 2,978,621 4/1961 Martinek ............................... 310/80
3,159,758 12/1964 Hemperly, Jr. et al. .............. 310/83
3,660,704 5/1972 Paine ..................................... 310/80

Primary Examiner—Donovan F. Duggan
Attorney, Agent, or Firm—C. R. Meland

[57] ABSTRACT

An electric motor powered actuator in which a shaft has a threaded connection with the rotor of an electric motor whereby rotation of the rotor causes axial translation of the shaft. The shaft is urged in one direction by a compression spring and the compression spring is interposed between the shaft and a spacer ring that engages one of the thrust bearings for the motor rotor. The compression spring has nonrotatable connections with the shaft and motor housing such that the torsional force of the spring prevents rotation of the shaft relative to the motor housing when the motor rotor is rotated.

8 Claims, 11 Drawing Figures

ELECTRIC MOTOR POWERED ACTUATOR

This invention relates to an electric motor operated actuator and more particularly to an electric motor operated actuator wherein the rotor of an electric motor has a threaded connection with a shaft whereby rotation of the rotor causes axial translation of the shaft.

In actuators of the type just described, where the electric motor is a stepping motor having relatively low torque output, a spring can be interposed between the housing of the motor and the shaft in order to aid movement of the shaft in one direction. For example, where the shaft operates the plunger of a valve mechanism that is subjected to a differential pressure that tends to oppose closing valve movement, the spring is arranged to aid the motor in projecting the valve toward a closed position.

When a spring is interposed between the motor housing and shaft to aid the motor in axially projecting the shaft it applies an axial force to the rotor. If there is end play between the rotor and the motor housing and if the spring is strong enough it may axially shift the rotor relative to the housing to take up the end play. If such shifting has occurred and the motor is now operated to axially project the shaft to a position where further axial movement of the shaft is prevented, such as where the shaft operates a valve plunger to a closed position against a valve seat, further energization of the motor may cause the rotor to thread itself along the now axially fixed shaft in a direction opposite the rotor shift caused by the spring until the motor stalls. Subsequent operation of the motor in an opposite direction, to retract the shaft, will cause the rotor to thread itself along the shaft until it takes up any clearance caused by the prior threading of the rotor along the shaft and until this clearance is taken up there is no axial translation of the shaft. Where the motor is operated by a series of digital pulses, from a digital control system, any rotation of the rotor without axial translation of the shaft can cause lost counts in the digital system. Thus, if the pulses of a digital system are counted and utilized as an indication of shaft position the fact that the rotor has been rotating in steps in response to the pulses without axial translation of the shaft will cause errors in the digital system.

It accordingly is one of the objects of this invention to provide an electric motor actuator of the type described wherein the rotor is prevented from being axially shifted by the force of the spring that aids the motor in moving the shaft in one direction. In accordance with one aspect of this invention a force transmitting element is provided which engages thrust bearing means for one end of the rotor. The force transmitting element has another portion engaged by a spring that is interposed between the shaft and the force transmitting element. With this arrangement the spring tends to aid the motor in projecting the shaft but does not axially shift the rotor relative to the motor housing.

In accordance with another aspect of this invention a coil spring is utilized to urge the shaft in one direction to aid the stepping motor in moving the shaft in that direction and prevents rotation of the shaft relative to the motor housing to ensure axial translation of the shaft when the rotor rotates. The coil spring is non-rotatably secured to the shaft and to the housing to prevent rotation of the shaft relative to the housing when the rotor rotates. By using the spring to prevent rotation of the shaft the spring thus performs a dual function in that the torsional force of the spring prevents rotation of the shaft and the compressive action of the spring operates to urge the shaft in one direction.

A more specific object of this invention is to provide an electric motor actuator of the type described wherein a coil spring is interposed between a spacer ring that engages thrust bearings means for the rotor of the motor and a valve plunger which is secured to the axially translatable shaft and wherein the end turns of the coil spring have squared portions engageable with complementary squared portions on the motor housing and valve plunger to thereby prevent relative rotation between the shaft and the motor housing. With this arrangement the coil spring serves to axially move the valve plunger toward a closed position to aid the stepping motor in driving the valve plunger toward a closed position and serves to prevent rotation of the shaft relative to the motor housing.

Still another object of this invention is to provide an arrangement of the type described wherein the force transmitting element that engages the coil spring has a plurality of pins extending through an end wall of the motor housing that engage thrust bearing means for the motor rotor and wherein this element has an annular face that engages one end of the coil spring.

IN THE DRAWINGS

Figure 1:
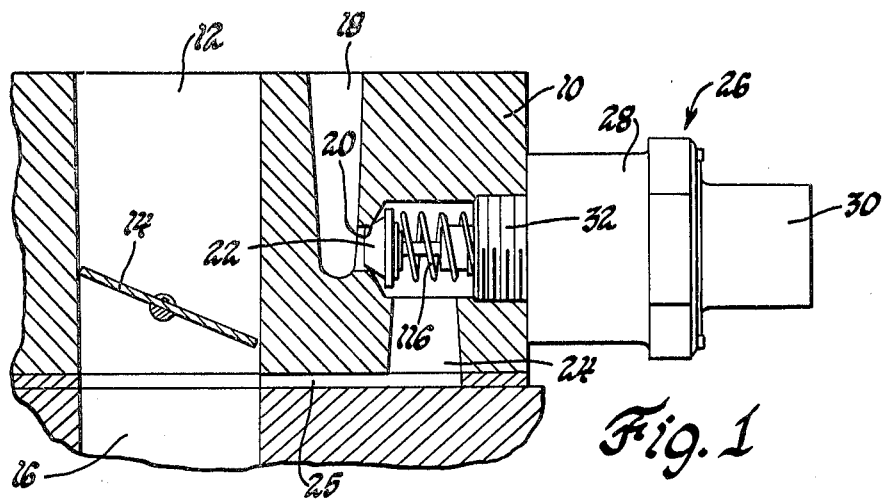
FIG. 1 is a view, partly in section, illustrating the electric motor operated actuator of this invention arranged to control air bypass in an internal combustion engine fuel supply system.

The actuator of this invention can be used to control idle air bypass in an internal combustion engine fuel supply apparatus and such use is illustrated in FIG. 1. In FIG. 1, the reference numeral 10 generally designates a fuel and air supply apparatus for an internal combustion engine having a bore 12 controlled by a throttle valve 14. The upper end of the bore 12 communicates with atmosphere while the lower end 16 communicates with the intake manifold of an internal combustion engine. The bore 12 is supplied with fuel, for example by a fuel injector disposed above throttle valve 14 which is not illustrated. The housing 10 further has a passage 18 that communicates with atmosphere and this passage terminates in a valve seat 20. The valve seat 20 cooperates with a valve plunger 22 which is shiftable toward and away from the valve seat by the actuator of this invention. It can be seen that when the valve 22 moves away from the valve seat 20 the passages 18 and 24 are connected. The passage 24 is connected to a passage 25 which communicates with the intake manifold passage 16. The valve 22 therefore controls air bypass around throttle plate 14. Since opposite sides of the valve plunger 22 are subjected respectively to atmospheric pressure (passage 18) and a lower intake manifold pressure (passage 24) a force is applied to the valve opposing closing movement of the valve.

The valve 22 is axially shifted by the electric motor powered actuator of this invention. This actuator, which is generally designated by reference numeral 26, comprises a stepper motor having a housing 28 and electrical connector 30. The motor housing 28 has a threaded portion 32 which is threaded into the housing 10 of the fuel control apparatus.

Figure 2:
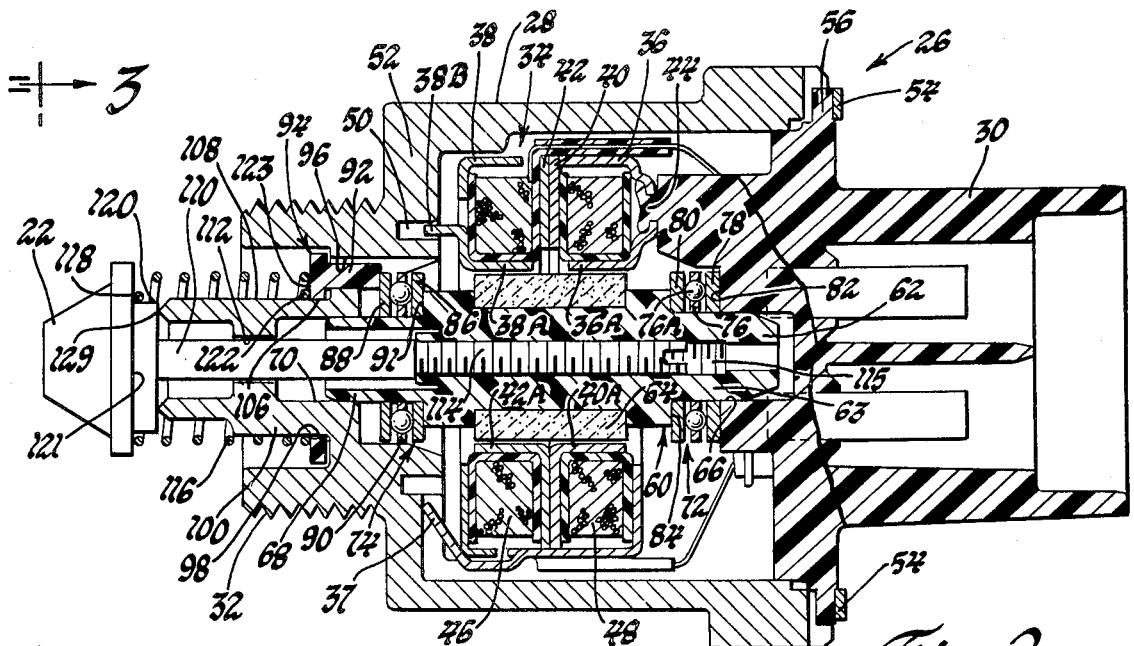
FIG. 2 is a view, partly in section, of the electric motor actuator of this invention.

Referring now more particularly to FIG. 2, a detailed description will now be given of the actuator 26. The motor housing 28, as depicted in FIG. 2, encompasses a stepping motor stator assembly generally designated by reference numeral 34. The stator assembly 34 comprises end housings 36 and 38 formed of metallic magnetic material such as steel, each of which have axially extending pole teeth 36A and 38A. The stator assembly further has a pair of pole plates 40 and 42 formed of steel which each have axially extending pole teeth 40A and 42A. The four sets of pole teeth are appropriately interleaved in a manner well known to those skilled in the art and in a twelve pole motor there are six pole teeth for each assembly.

The housing 36 is secured to the electrical connector 30, which is formed of insulating material, by heading over portions 44 of the electrical connector 30 into engagement with the metallic housing 36. One such connection is illustrated in FIG. 2 but preferably there are three portions headed over to secure one end of the stator assembly to the electrical connector portion 30. The motor stator assembly further includes coil windings 46 and 48 which are wound on suitable coil forms formed of insulating material. The coil forms and coils 46 and 48 are sandwiched, respectively, between housings 38 and 42 and 36 and 40. In order to axially clamp the entire stator assembly the housing 36 is provided with tabs 37 which are bent over the housing 38. Further, the housing 38 has integral axially extending portions 38B which are, respectively, positioned within recesses 50 formed in the motor housing 28. Although only one projecting portion 38B and one recess 50 has been illustrated, there are three such extending portions and recesses which are operative to support the stator assembly at its end facing the end wall 52 of the motor housing 28. This prevents radial movement of the stator assembly relative to the motor housing.

The electrical connector 30, which is attached to the stator unit 34, is secured to the motor housing 28 by staking over portions 54 of the motor housing into engagement with radially extending portion 56 of the electrical connector 30. The tabs 37 engage an inner end portion of the end wall 52 when the connector 30 and attached stator assembly 34 are secured to the motor housing 28 and can bend to take up any variations in axial dimensions.

The stepping motor further includes a rotor which is generally designated by reference numeral 60. This rotor comprises a part 62, formed of insulating material, which has an annular permanent magnet 64 molded thereto. The permanent magnet 64 is preferably formed of a barium ferrite material and is magnetized axially with alternate north and south poles in a manner well known to those skilled in the art. In a twelve pole motor there are six pairs of circumferentially spaced magnetic areas of alternating north and south polarity when proceeding circumferentially of the magnet.

The right end of the rotor 60 is journaled for rotation in a circular bore 66 formed in the connector 30 of the motor. The left end of the motor rotor, namely portion 68 is journaled for rotation in the annular bore 70 of the motor housing 28.

The electric motor actuator has two thrust bearings designated respectively by reference numerals 72 and 74. The thrust bearing 72 is comprised of a ball bearing assembly 76 interposed between thrust plates 78 and 80 which are disposed about the end portion 63 of the rotor 60. The assembly 76 is comprised of balls 76A disposed between inner and outer retainers and the balls contact, respectively, thrust washers 78 and 80. The plate 78 contacts a wall portion 82 of the housing 30. The thrust plate 80 engages an annular wall portion 84 of the rotor 60.

The thrust bearing 74 is comprised of annular thrust washers 86 and 88 with a ball bearing assembly 90, like assembly 76, being interposed therebetween. The thrust washer 86 is disposed about the portion 68 of the rotor and engages an annular wall portion 91 of the rotor. Further, the thrust plate 88 is disposed about the portion 68 of the rotor and its left face, as viewed in FIG. 2, engages the ends of projecting portions or pins 92 of a spacer ring generally designated by reference numeral 94 and illustrated in the perspective view of FIG. 4. This ring is formed of a plastic material such as reinforced polyester. The portions 92 of the spacer ring 94 respectively project through three openings 96 formed in the motor housing 28 and best illustrated in FIG. 4. The spacer ring 94 has an internal wall 98 which conforms to the external wall 100 of the motor housing 28. This configuration includes portions 102 which fit within motor housing grooves 104. Further, the spacer ring 94 has an internal flat portion 106 corresponding to the flat section 108 of the motor housing. The fit between the ring 94 and the motor housing is such that the ring can move axially of the housing.

Figure 3:
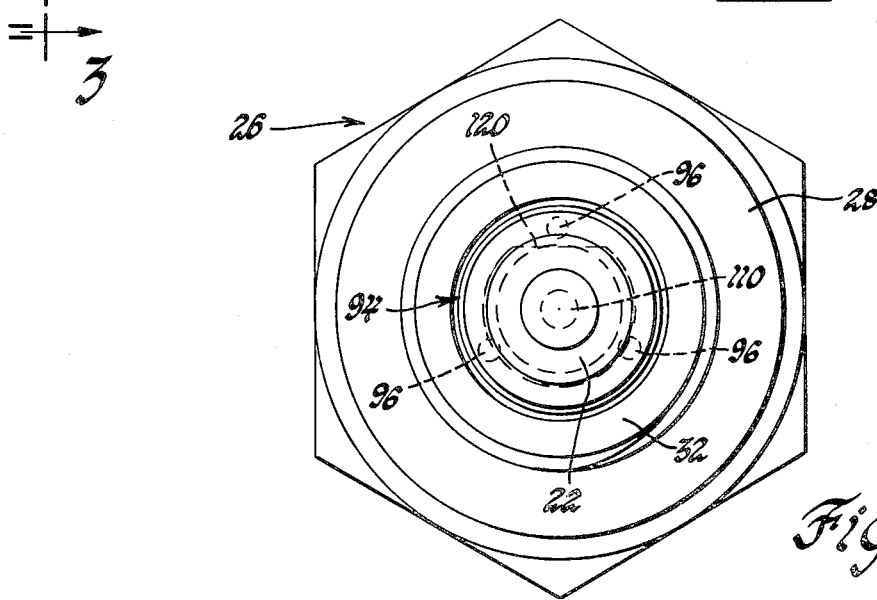
FIG. 3 is an end view of the actuator shown in FIG. 2 looking in the direction of lines 3—3 of FIG. 2.

The valve plunger 22 is secured to an actuating shaft 110, for example by providing a threaded bore in the valve 22, which is not illustrated, that receives a complementary external threaded section on the shaft 110 which is also not illustrated. The shaft 110 extends through opening 112 formed in the motor housing 28 and has another threaded portion 114 that is threaded into a complementary threaded portion 115 formed on the interior of the plastic rotor part 62. The threads are arranged such that rotary movement of the rotor 60 will axially translate the shaft 110 in a manner to be more fully described hereinafter. The threads may be arranged such that clockwise rotation of rotor 60, as viewed in FIG. 3, retracts shaft 110 and counterclockwise rotation projects shaft 110.

The valve plunger 22 is urged to the closed position shown in FIG. 1 and to the left in FIG. 2 by a coil spring generally designated by reference numeral 116. The spring aids the motor in closing the valve against the differential pressure set up by passages 18 and 24 which pressure opposes closing of the valve. This coil spring has a straight or flat portion 118 which engages a complementary flat portion 120 formed on the valve plunger 22. The opposite end of the spring 116 has another flat or squared portion 122 which engages the flat portion 108 of the motor housing 28. The ends of the spring 116 further respectively engage an annular wall 121 of the valve plunger 22 and the end wall 123 of the spacer ring 94.

Not only does the spring 116, by compressive action, urge the valve plunger towards closed position but it also serves to prevent rotation of the shaft 110 when motor rotor 60 rotates. Thus, since the ends of spring 116 are nonrotatably connected respectively to valve plunger 22 and motor housing 28 the torsional force of the spring prevents rotation of shaft 110 when motor rotor 60 rotates. This force is sufficient to prevent the threaded connection between the rotor 60 and shaft 110 from rotating the shaft with the rotor and as a result axial translation of the shaft takes place.

The stator assembly 34 and the rotor 60 comprise a stepper motor of a type known to those skilled in the art. By energizing the coil windings 46 and 48 with a series of pulses the rotor 60 is rotated in predetermined increments to cause a predetermined axial translation of the shaft 110 and its connected valve plunger 22. The pulse energization of the coils 46 and 48 can be controlled by a digital system so that the amount of axial translation of shaft 110 is a function of the number of pulses applied to coils 46 and 48.

In order to explain the function of the spacer ring 94 let it be assumed that the actuator of FIG. 2 did not have such a ring or, in other words, an arrangement in which the spring 116 would bear directly against the motor housing to urge the valve in a closing direction. With such a hypothetical arrangement it will be apparent that the spring 116 would have a tendency to shift the rotor 60 to the left in FIG. 2 to take up any end play between thrust bearing 74 and the motor housing. If such end play occurred there would be some axial clearance between thrust bearing 72 and the parts it engages. If the rotor were now rotated an amount sufficient to axially translate the valve plunger 22 into engagement with the valve seat 20 the shaft 110 can no longer move axially and as a result the rotor could continue to rotate along the fixed shaft 110 to the right in FIG. 2 until the clearance at thrust bearing 72 was taken up. Subsequent rotation of the rotor in an opposite direction to retract shaft 110 would now cause the rotor to rotate to some degree before it took up the clearance between it and the thrust bearing 74. This would result in rotation of the rotor without axial translation of the shaft 110 and in a digital system, which counts pulses applied to the coil windings of the motor as a measure of the axial position of the shaft 110 would result in lost counts and resultant error.

The spacer ring 94 is arranged to prevent the spring 116 from forcing the rotor 60 to the left in FIG. 2 while still permitting the spring to produce the desired closing force on valve plunger 22. Thus, it can be seen that since the spring 116 is compressed between valve plunger 22 and spacer ring 94 the spring urges portions 92 of spacer ring 94 against thrust washer 88 and also tends to force wall 91 of rotor 60 against thrust plate 86. Thus, although the spring 116 provides a force between it and ring 94 which aids the motor in the closing movement of the valve plunger 22 it does not tend to move the entire rotor assembly to the left in FIG. 2 because the spring force applied to thrust washer 86 via shaft 100 and rotor wall 91 is offset by an opposite spring force applied to washer 88 via ring 94. Further, when the rotor 60 is rotated counterclockwise to axially translate the valve plunger 22 to a closed position the motor will stall when the valve plunger 22 engages the valve seat 20 providing there is no end play in thrust bearing 72 that might be taken up by continued rotation of the rotor to a stall condition. In the event that there is any play in thrust bearing 72, this end play will be taken up by rotation of the rotor along the shaft after the valve 22 engages the valve seat whereupon the motor will stall. However, if this happens the spring 116 will axially shift spacer 94 to take up any end play or lost motion in thrust bearing 74 so that upon subsequent rotation of the motor rotor, in an opposite direction to retract the valve, the valve will be immediately axially translated without lost count error.

Figure 5:
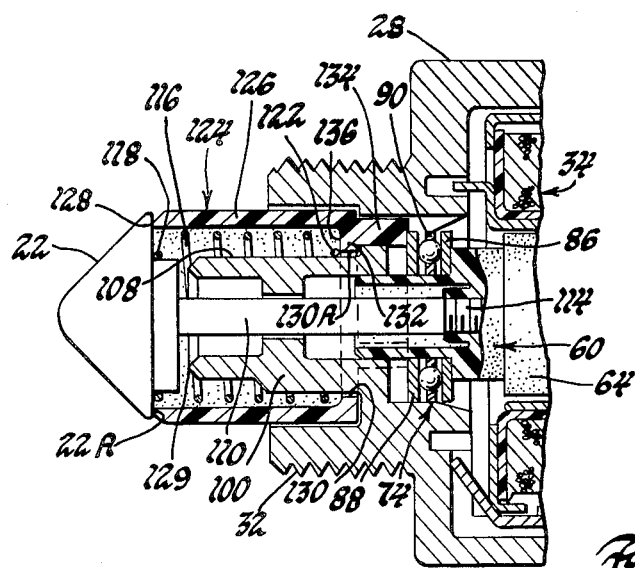
FIG. 5 illustrates an actuator having a modified spacer ring arrangement.
Figure 6:
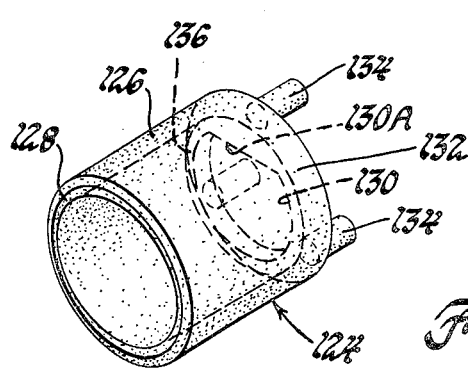
FIG. 6 is a perspective view of a modified spacer ring used in the arrangement illustrated in FIG. 5.

FIGS. 5 and 6 illustrate a modified spacer ring which performs the same function as spacer ring 94 but which also prevents lost count error when valve plunger 22 is moved to a fully open position.

In FIG. 5 only the end portion of the FIG. 2 motor is illustrated it being understood that the portions not illustrated in FIG. 5 are identical with the motor illustrated in FIG. 2. In FIG. 5 the same reference numerals have been used as were used in the FIG. 2 embodiment to identify identical parts in each figure. The FIG. 5 embodiment differs from the FIG. 2 embodiment in that a modified spacer ring, generally designated by reference numeral 124, is utilized. This ring, like spacer ring 94, is formed of a plastic material such as a reinforced polyester. This spacer ring has a hollow annular portion 126 that has an annular end wall 128 and an opening 130 which is adapted to receive the end portion 100 of the motor housing. The wall defining the opening 130 has a flat portion 130 complementary to flat motor housing wall portion 108. The spacer ring 124 further has an annular wall 132 from which extend projecting portions 134. The pins or projecting portions 134 perform the same function as the pins or projecting portions 92 of the spacer ring 94 in that they engage the thrust washer 88. The spacer ring 124 has an inner annular internal wall 136 which engages one end of the spring 116. The spring has a flat section 122, like that in FIG. 4, which engages the flat portion 108 of the motor housing. Further, like the FIG. 4 embodiment, the spring has a flat section 118 engaging the flat section 120 of the valve 22.

Figure 4:
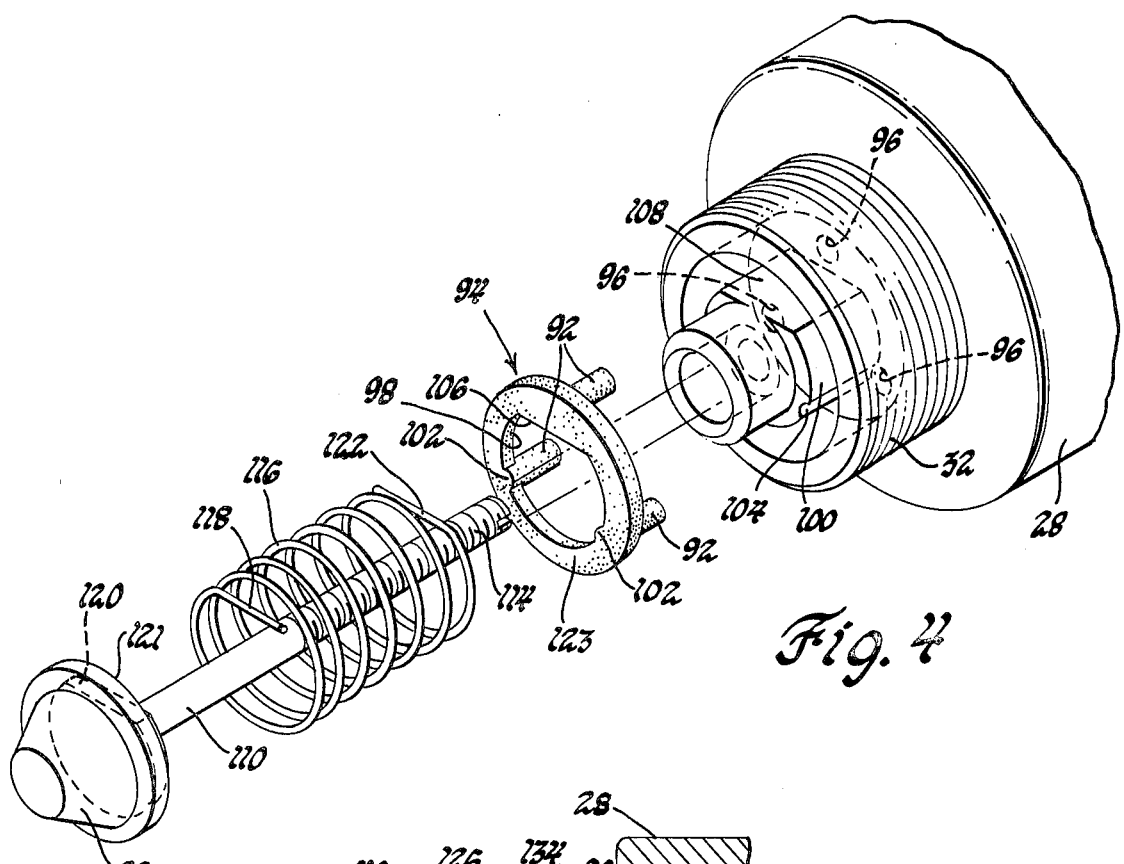
FIG. 4 is a perspective view of a portion of the actuator shown in FIG. 2.

The spacer ring arrangement of FIG. 5 operates in the same manner as the one illustrated in FIG. 4 in regard to the condition of operation in which the valve plunger 22 is forced against the valve seat 20. The ring 124, however, provides an additional function in that during opening movement of the valve, or in other words movement of the valve plunger toward the right in FIG. 5, the portion 22A of the valve plunger 22 will engage the annular portion 128 of the spacer ring 124 prior to engagement of the valve plunger 22 with the end 129 of the motor housing. In this regard, the valve plunger 22, in the FIG. 5 embodiment, has a larger diameter than the one shown in FIGS. 2 and 4 so as to engage portion 128 of spacer ring 124 in a manner shown in FIG. 5.

Thus, if the rotor is stepped in a clockwise direction by an amount sufficient to retract the valve plunger 22 against portion 128 of spacer ring 124 the motor will stall. In contrast, if the elongated spacer ring 124 was not provided the valve plunger would engage the end 129 of the motor housing as shown in the FIG. 2 embodiment. The torque of the motor may be sufficient, under this condition of operation, to force the thrust bearing 74 and the ring 94, in the FIG. 2 embodiment, to the left compressing the spring 116. This movement would provide some end play at thrust bearing 72 with the result that when the motor is now energized to project the valve plunger 22, that is where the motor is subsequently operated in a counterclockwise direction, the rotor could move axially along the shaft 110 to the right in FIG. 2 to take up the end play. Thus, the rotor would be rotating without axially translating the shaft 110. By using the spacer ring 124, shown in FIG. 5, which engages the valve plunger 22 prior to its engagement with the end 129 of the motor housing the motor stalls without compressing the spring 116 and without axially shifting the thrust bearing 74. Thus, when the plunger 22 engages the end 128 of spacer ring 124, the spring 116 cannot be compressed because the spacer ring is interposed between valve plunger 22 and thrust washer 88 and thereby forms a blocking means preventing movement of thrust bearing 74 toward valve plunger 22. In summary, the FIG. 5 embodiment provides for stalling of the motor in the case where the valve plunger is fully projected into engagement with the valve seat 20 and where the valve plunger is fully retracted against the end 128 of the spacer ring 124.

Figure 7:
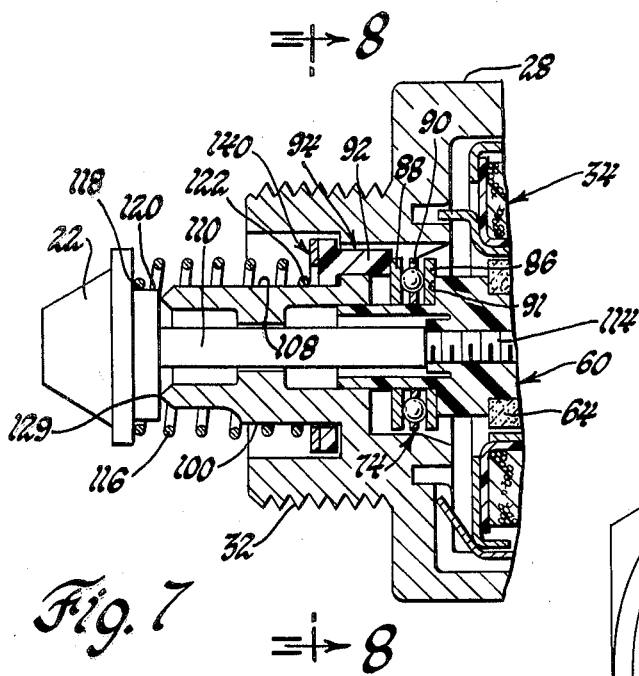
FIG. 7 illustrates an actuator having another modified spacer ring arrangement.
Figure 8:
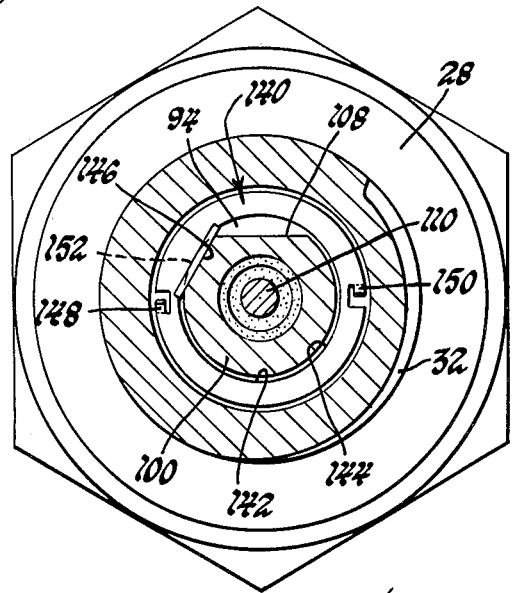
FIG. 8 is a sectional view taken along lines 8—8 of FIG. 7.

Referring now more particularly to FIGS. 7 through 11, an arrangement is illustrated in which a keeper ring 140 is utilized to take up any axial end play in the rotor bearing arrangement. FIG. 7 illustrates a portion of the actuator shown in FIG. 2, revised to illustrate the keeper ring 140, it being understood that the actuator of FIG. 7 is otherwise the same as the one shown in FIG. 2. The same reference numerals have been used in FIGS. 2 and 7 to identify corresponding parts in each figure.

Figure 9:
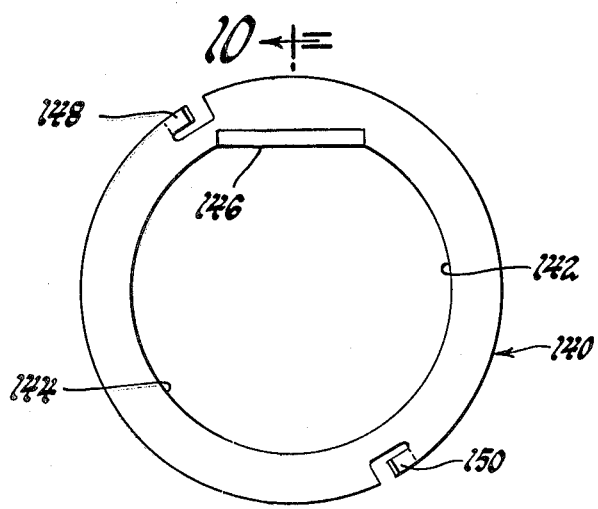
FIG. 9 is an end view of a keeper ring used in the arrangement shown in FIG. 7.
Figure 10:
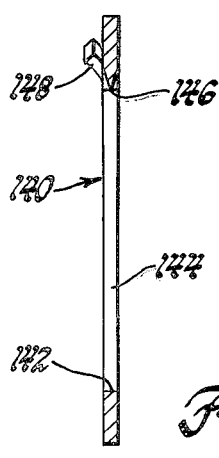
FIG. 10 is a sectional view taken along lines 10—10 of FIG. 9.
Figure 11:
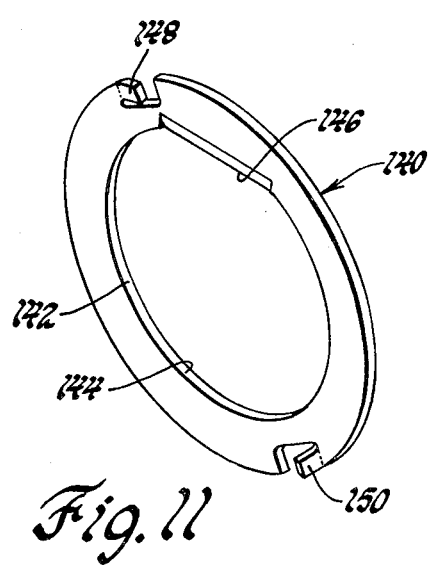
FIG. 11 is a perspective view of the keeper ring shown in FIG. 9.

In FIG. 7, the keeper ring 140 abuts the left side of the spacer ring 94. The spacer ring 94 is identical to the ring 94 shown in FIGS. 2 and 4 and the pins 92 of the spacer ring 94 abut the thrust washer 88 of thrust bearing 74. The opposite side of the keeper ring 140 is engaged by one end of the spring 116 that is interposed between the valve plunger 22 and the keeper ring 140 in order to urge the valve plunger in a projected direction. The keeper ring 140 is illustrated in detail in FIGS. 9 through 11 and it has a central opening 142 defined by a cicumferentially extending internal wall 144 and a straight wall portion 146. The straight portion 146 has a sharp V-shaped edge as is illustrated in FIG. 10. The keeper ring 140 is further provided with struck out tangs or lugs 148 and 150 which are illustrated in FIGS. 9 and 11. The purpose of these lugs is to form abutments that can be engaged by a tool to rotate the keeper ring 140 to an assembled position in a manner that is more fully described hereinafter.

When assembling the keeper ring 140 to the motor, the keeper ring is slipped over the portion 100 of the motor housing. In this regard, the internal configuration of the opening 142 (walls 144 and 146) corresponds to the circumferentially extending portion 100 and the flat portion 108 of the motor housing. With the keeper ring abutting the left side of the spacer ring 94 a suitable tool is brought to bear against the left side of the keeper ring which applies an axial force to the ring that is sufficient to abut the thrust washer 78 against the wall 82 of the motor housing (FIG. 2) and to clamp the thrust bearing 74 between the pins 92 of spacer ring 94 and the rotor wall 91. The force is sufficient to take up any end play in the thrust bearings without binding the rotor. The tool is provided with suitable abutment means that engage the tangs 148 and 150 to rotatably drive the keeper ring. With the assembly compressed by the tool, the tool is rotated to rotate the keeper ring to the FIG. 8 position in which the sharp edge 146 bites into a portion 152 of the motor housing. This secures the keeper ring 140 from axial movement relative to the motor housing and therefore prevents any end play in the thrust bearings of the motor. As a result, the motor will stall when the valve is operated to either its fully projected or retracted positions.

In the embodiment of FIG. 7 the spring 116 abuts one side of the keeper ring 140 and, like the FIG. 4 arrangement, has a straight portion 122 engaging the flat portion 108 of the motor housing to fix one end of the spring from rotation relative to the motor housing. Further, the straight portion 118 of the spring engages the flat portion 120 of the valve plunger 22 to prevent rotation of the valve shaft 110 relative to the motor housing when the motor rotor is rotated. From the foregoing it will be appreciated that the modified arrangement illustrated in FIGS. 7 through 11 uses the same parts as the arrangement shown in FIGS. 2 and 4 but fixes the insert 94 from movement to the left in FIG. 7 by use of the keeper ring 140.

As has been mentioned, one of the features of this invention resides in the use of spring 116 to aid the motor in projecting the valve shaft while also serving to prevent rotation of the shaft relative to the motor housing. Insofar as this aspect of the invention is concerned the end 122 of spring 116 could directly engage the motor housing instead of spacer rings or retaining rings in an application where these parts are not desired.

The embodiments of the invention in which an exclusive property or privilege is claimed are defined as follows:

1. An electric motor powered actuator comprising in combination;
    a shaft axially movable between an extended and stopped position and varying retracted positions,
    a motor rotor telescoped on said shaft and in threaded relation therewith to position the shaft in accord with rotation of the rotor,
    a first thrust bearing effective to oppose movement of the rotor in the retraction direction when the shaft is in extended and stopped position,
    a second thrust bearing, one side of which engages said rotor, effective to oppose movement of the rotor in the extended direction, and
    resilient means effective to exert a resilient expanding force between the shaft and an opposite side of said second thrust bearing to aid the motor in moving the shaft in the extended direction and to take up any last motion between the second thrust bearing and the rotor.

2. A stepper motor powered actuator comprising in combination;
    a shaft axially movable between an extended and stopped position and varying retracted positions,
    an electric stepper motor comprising housing means and a rotor telescoped on said shaft in threaded relation therewith to position the shaft in accord with rotation of the rotor,
    a first thrust bearing effective to oppose movement of the rotor in the retraction direction when the shaft is in extended and stopped position,
    a second thrust bearing, one side of which engages said rotor, effective to oppose movement of the rotor in the extended direction, a force transmitting element slidably supported by said housing means engaging an opposite side of said second thrust bearing, and resilient means interposed between said force transmitting element and said shaft effective to exert a resilient expanding force between the shaft and said opposite side of said second thrust bearing to aid the motor in moving the shaft in the extended direction and to take up any last motion between the second thrust bearing and the rotor.

3. An electric motor operated actuator comprising;

a motor housing having an end wall, a shaft extending through said end wall, an electric motor comprising a stator and a rotor supported by said housing, first and second thrust bearings engaging, respectively, opposite ends of said rotor, means providing a threaded connection between said rotor and shaft whereby rotary movement of said rotor causes axial movement of said shaft, a spacer having a wall portion located at the exterior of said motor housing end wall and having portions extending through openings formed in said end wall that engage said first thrust bearing, and resilient means interposed between said shaft and said wall portion of said spacer operative to urge said shaft in a direction away from said spacer to thereby aid the motor in moving the shaft in that direction and effective to take up any end play in said first thrust bearing.

4. An electric motor operated actuator comprising;

a motor housing having an end wall, a shaft extending through said end wall having an abutment, an electric motor comprising a stator and a rotor supported by said housing, first and second thrust bearings engaging, respectively, opposite ends of said rotor, means providing a threaded connection between said rotor and shaft whereby selective rotary movement of said rotor causes axial movement of said shaft in retracted or extended directions, a spacer having a wall portion located at the exterior of said motor housing end wall having portions extending through openings formed in said end wall that engage said first thrust bearing, and resilient means interposed between said shaft abutment and said wall portion of said spacer operative to urge said shaft in an extended direction away from said spacer to thereby aid the motor in moving the shaft in that direction and effective to take up any end play in said first thrust bearing, the axial length of said spacer being such that said shaft abutment engages the end of said spacer when said shaft is moved in a retracted direction prior to engagement with said motor housing.

5. An electric motor operated actuator for translating rotary movement of the rotor of the motor into axial movement of a shaft comprising;

a motor housing having an end wall, an electric motor comprising a stator and a rotor supported by said motor housing, a shaft extending through said end wall, means providing a threaded connection between said rotor and shaft whereby rotary movement of said rotor causes axial movement of said shaft, thrust bearings engaging, respectively, opposite ends of said rotor, a spacer ring disposed about said shaft having axially projecting portions extending through openings formed in said motor housing end wall the ends of which engage one of said thrust bearings, and a compression spring interposed between said spacer ring and said shaft for urging said shaft in a direction away from motor housing to thereby aid the motor in moving the shaft in that direction, said spring having axially spaced nonrotatable connections to said shaft and motor housing to prevent, by torsional force of the spring, relative rotation between said shaft and motor housing when said rotor rotates.

6. An electric motor operated actuator for translating rotary movement of the rotor of the motor into axial movement of a shaft comprising;

motor housing means, an electric motor comprising a stator and a rotor supported by said housing means, a shaft having a threaded connection with said rotor operative to move the shaft axially when the rotor is rotated, and a coil spring disposed about said shaft arranged to urge said shaft in a direction away from said motor housing, said coil spring having axially spaced portions that are nonrotatably connected, respectively, to said shaft and housing means to thereby prevent, by the torsional force of the spring, relative rotation between said shaft and housing means when said rotor rotates relative to said housing means.

7. An electric motor operated actuator for translating rotary movement of the rotor of the motor into axial movement of a shaft comprising;

a motor housing having an end wall, an electric motor comprising a stator and a rotor supported by said motor housing, a shaft extending through said end wall, means providing a threaded connection between said rotor and shaft whereby rotary movement of said rotor causes axial movement of said shaft, thrust bearings engaging, respectively, opposite ends of said rotor, a spacer having an annular portion disposed about said shaft and having axially projecting portions extending through openings formed in said motor housing end wall the ends of which engage one of said thrust bearings, retainer means fixed to said motor housing engaging said spacer for preventing axial movement of said spacer relative to said motor housing, said spacer being axially positioned to prevent end play of said rotor and thrust bearings, and a compression spring interposed between said spacer ring and said shaft for urging said shaft in a direction away from motor housing to thereby aid the motor in moving the shaft in that direction.

8. An electric motor operated actuator for translating rotary movement of the rotor of the motor into axial movement of a shaft comprising;

a motor housing having an end wall, an electric motor comprising a stator and a rotor supported by said motor housing, a shaft extending through said end wall, means providing a threaded connection between said rotor and shaft whereby rotary movement of said rotor causes axial movement of said shaft, thrust bearings engaging, respectively, opposite ends of said rotor, a spacer ring having an annular portion disposed about said shaft and having axially projecting portions extending through openings formed in said motor housing end wall the ends of which engage one of said thrust bearings, an annular retainer fixed to said motor housing engaging the annular portion of said spacer ring for preventing axial movement of said spacer relative to said motor housing, said spacer and retainer being axially positioned to prevent end play of said rotor and thrust bearings, and a compression spring interposed between said retainer ring and said shaft for urging said shaft in a direction away from motor housing to thereby aid the motor in moving the shaft in that direction.

* * * * *